March 4, 1930.   R. CRAIG   1,749,324
STORAGE AND HANDLING OF MOTOR VEHICLES
Filed Aug. 1, 1924
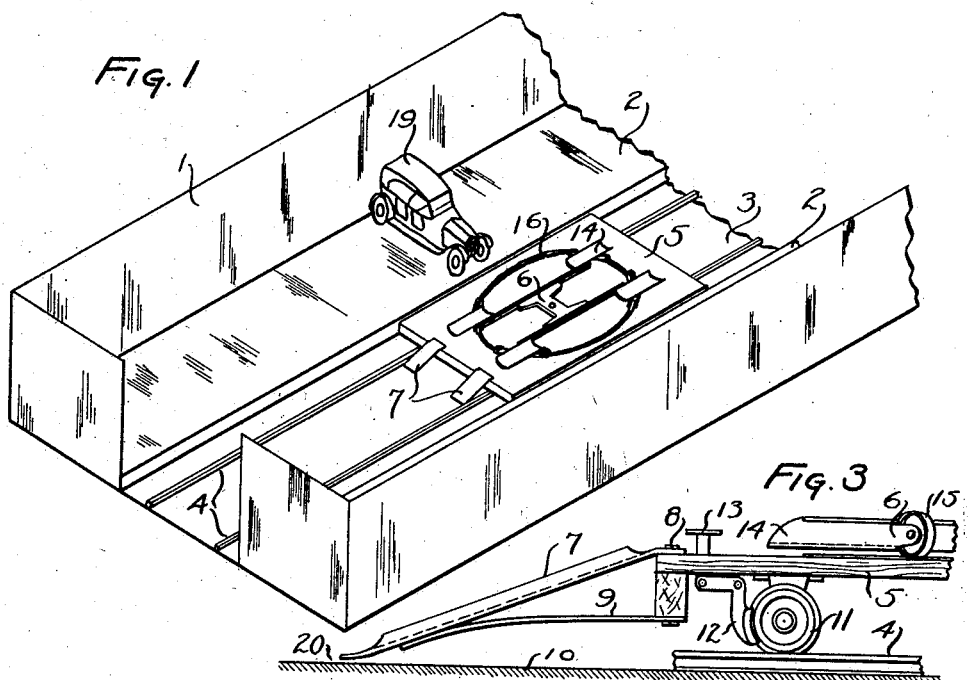
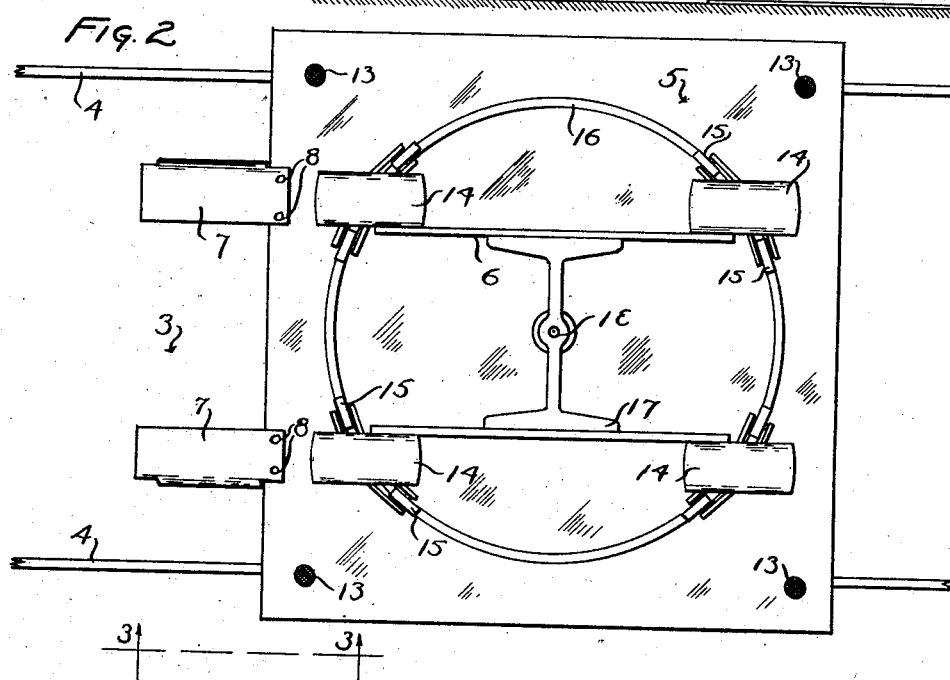
INVENTOR.
Robert Craig Patented Mar. 4, 1930

1,749,324

UNITED STATES PATENT OFFICE

ROBERT CRAIG, OF DAYTON, OHIO

STORAGE AND HANDLING OF MOTOR VEHICLES

Application filed August 1, 1924. Serial No. 729,524.

The object of this invention is to provide a system for the storage and handling of automobiles, whereby the area of the storage space is more completely used for the storage of cars, no space is required for turning, backing, and maneuvering cars within the garage, vehicles are handled into or out of the garage with ease and dispatch, and all liability of damage to the vehicles themselves is avoided. Further and other objects and advantages of the present invention will hereafter appear in the accompanying specification and claims, and in the drawings which by way of illustration show what I now consider to be a preferred embodiment of the invention.

In general, my invention comprises a transfer table carrying a turntable operable in connection with a storage space within the garage so that any car may be parked in or removed from its individual space in minimum time, with little effort, and without disturbing any other cars parked in adjacent spaces.

In the drawings, which illustrate the construction and operation of my invention, Fig. 1 is a perspective view of a portion of a garage showing transfer turntable installed.

Fig. 2, is a plan view of the transfer table with turntable, inclined runways, and track.

Fig. 3 is a view as indicated by 3—3 in Fig. 2, showing the automatic braking means.

The apparatus illustrated comprises a garage 1, provided with two parallel parking spaces 2, spaced apart to leave the aisle 3 provided with tracks 4 on which travels the transfer table 5 carrying the turntable 6.

The transfer table is provided with inclined runways 7 attached yieldingly to the transfer table at 8 and supported by springs 9 so as to be normally out of contact with the floor 10.

The transfer table consists of a framework mounted on wheels 11 running on tracks 4. One or more of the wheels are provided with foot brakes 12 operated by buttons 13 for a purpose hereafter explained.

Any suitable turntable may be provided, the preferred type being as shown, which is covered by my Patent 1,237,022, Aug. 14, 1917. It consists of four shoes 14 carried on wheels 15 running on the circular track 16. The shoes 14 are secured to the frame 17, which has a central eye fitting loosely over the fixed pivot pin 18.

In operation, when a vehicle enters the garage the transfer table is moved, manually or otherwise, along the rails until it is opposite the particular parking space the car is to occupy. The car is then driven up the inclined runways onto the turntable and stopped with one wheel of the car on each of the four shoes 14. The turntable and car are then turned 90 degrees and the car moved into its individual space without any maneuvering. It then stands as shown at 19 in Fig. 1. To remove a car from its parking space the above operations are performed in reverse order.

In the operation described above the transfer table is moved to the place it is required before the car is on it, but, if desired, the transfer table may be used for transporting cars from one location to another anywhere within the reach of the trackway, as, for instance, when a car is disabled and it is desired to move to or from a shop in the rear.

In operation it is necessary to brake the transfer table to prevent its moving when a car is being run on or off. This is automatically provided for by the yielding runways 7 supported by resilient members 9. The members 9 carry the runways 7 so their ends 20 are just clear of the floor 10. When the wheels of an automobile roll onto said runways, the lower ends 20 are depressed and held firmly in contact with the floor until the wheels roll off the runways. Thus it will be seen that the device provides a brake that is automatically applied in contact with the floor when needed and automatically released when no longer required.

The foot brake 12 is applied by button 13, foot operated, whenever the automatic brake may not be suitable, as for instance, when the transfer table is being moved, either loaded or unloaded, and it is desired to stop it at any particular point.

In accordance with the provisions of the patent statutes, I have herein described the principle of operation of my invention, together with the apparatus which I now consider to represent the best embodiment thereof, but I desire to have it understood that the apparatus disclosed is only illustrative and that the invention may be carried out by other means. Also, while it is designed to use the various features and elements in the combinations and relations described, some of these may be altered and others omitted, and some of the features of each modification may be embodied in the others without interfering with the more general results outlined, and the invention extends to such use.

I claim as my invention:

1. An apparatus of the class described, comprising in combination, means to transport a wheeled vehicle, and means to turn said vehicle while on said transporting means, said turning means comprising a turntable having a rotatable frame, a plurality of wheeled members fast to said frame and rotatable therewith, said wheeled members serving to support the vehicle wheels out of contact with said transporting means while said turntable is being rotated; said transporting means providing an unbroken upper surface upon which the wheels of the vehicle may roll while not on said wheeled members and upon which the wheels of said wheeled members may roll while the turning means is being turned.

2. In combination, a transfer table, and a turntable for wheeled vehicles mounted for rotation on said transfer table; said turntable comprising a pivot member and a plurality of vehicle wheel supporting members guided for rotation about said pivot member; said transfer table including a surface upon which the wheels of the vehicle may roll while not on said supporting members, said surface providing an unbroken track upon which the wheels of said members may roll while the turntable is being turned.

3. The invention set forth in claim 2, in which said supporting members comprise wheeled shoes.

4. The invention set forth in claim 2, in which said supporting members comprise shoes carried by wheels having axes radial from said pivot member.

5. In a machine for handling wheeled vehicles, in combination, a transfer table, and a turntable mounted for rotation thereon; said turntable comprising a plurality of supports for the wheels of the vehicle to be turned, said supports being channel shaped with comparatively high side portions to serve as guides for the vehicle wheels, and with comparatively low center portions onto which the vehicle wheels may be easily rolled; said transfer table including a surface upon which the wheels of the vehicle may roll while not on said supports, said surface providing an unbroken track upon which the wheels of said supports may roll while the turntable is being turned.

6. A machine of the class described comprising in combination, a transfer table, and a turntable for wheeled vehicles mounted for rotation thereon; said turntable comprising a plurality of wheeled supports for the wheels of the vehicle and means to hold said wheeled supports in spaced alignment while the vehicle is rolling on or off said turntable; said transfer table comprising a smooth surface upon which the wheels of the vehicle may roll while not on said supports, said surface providing an unbroken track upon which the wheels of said supports may roll while the turntable is being turned.

7. The invention set forth in claim 5, in which a separate wheeled support is provided for each wheel of the vehicle.

In testimony whereof I hereunto affix my signature.

ROBERT CRAIG.